Sept. 1, 1942.	E. REINECKE	2,294,572
GRANULATING SIFTER
Filed Sept. 21, 1940	2 Sheets-Sheet 1
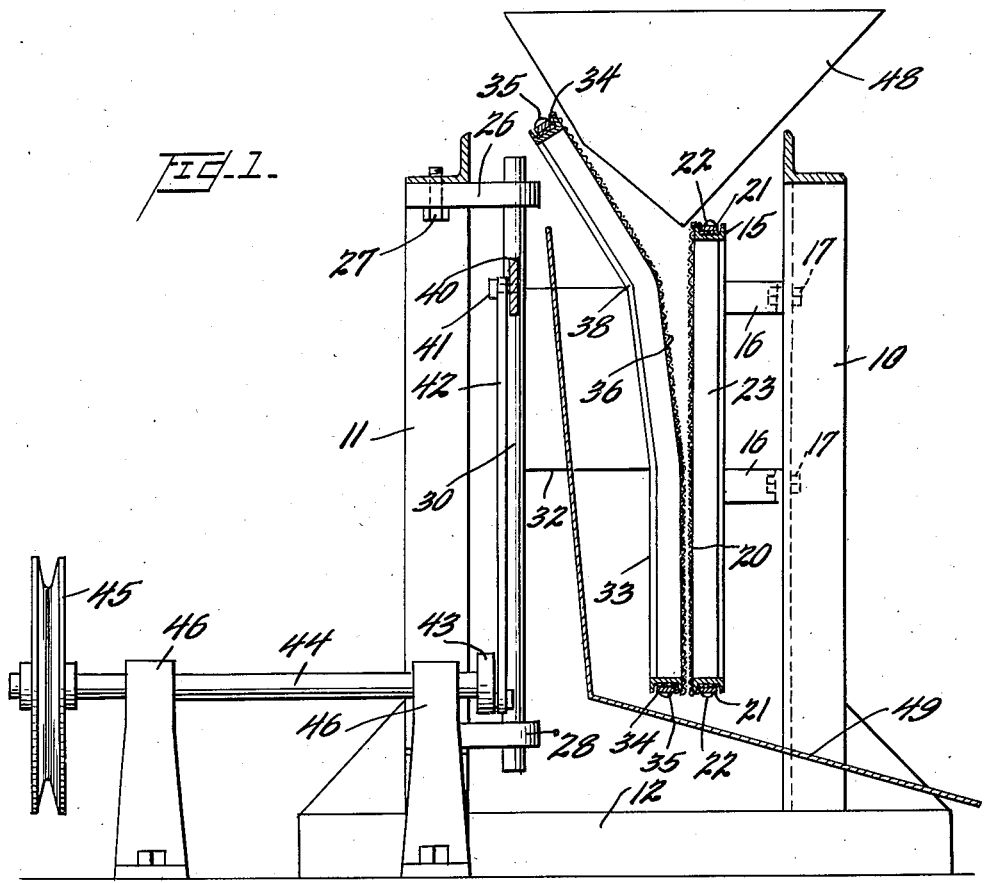
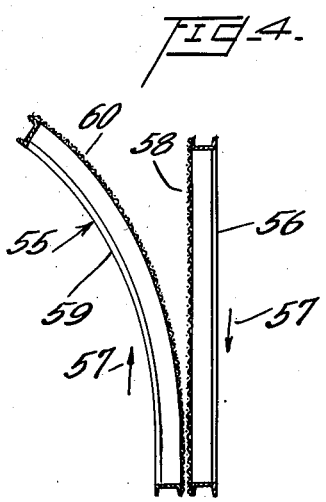
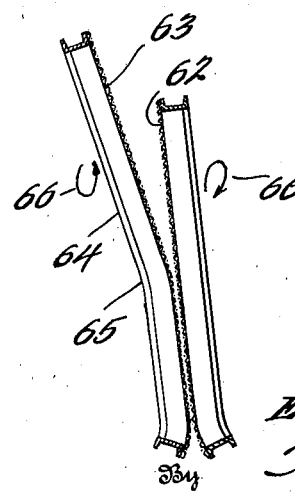
Inventor
Ernst Reinecke,
By Henry H. Snelling
Attorney

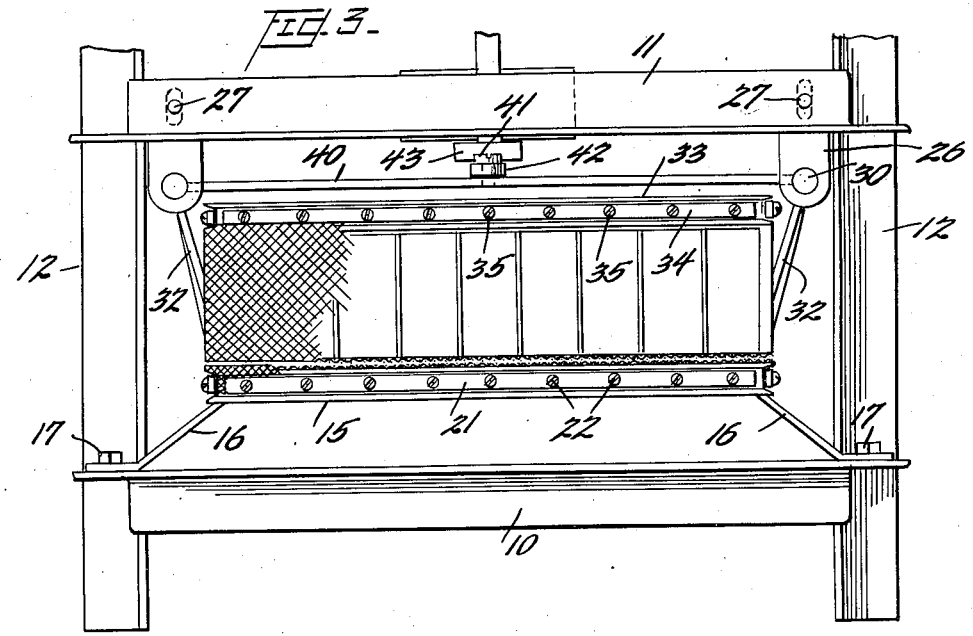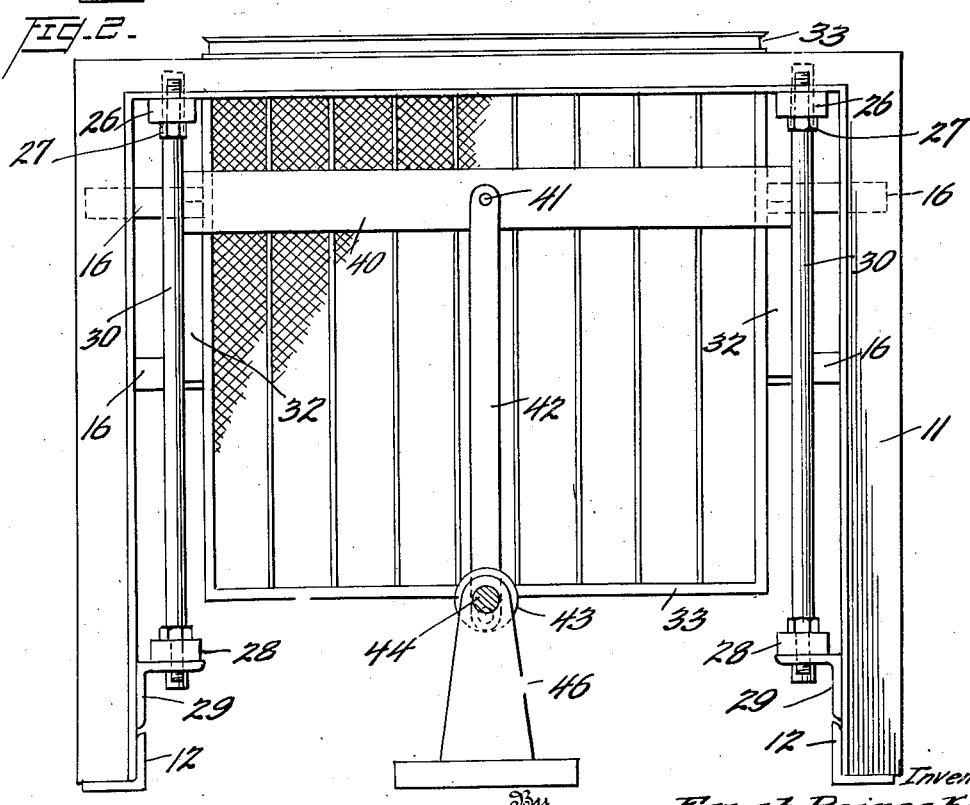

Patented Sept. 1, 1942

2,294,572

UNITED STATES PATENT OFFICE 2,294,572

GRANULATING SIFTER

Ernst Reinecke, Little Falls, N. Y., assignor to Chr. Hansen's Laboratory, Inc., Little Falls, N. Y., a corporation of New York Application September 21, 1940, Serial No. 357,800

2 Claims. (Cl. 83—61)

This invention relates to sifting and has for its principal object the provision of a method and a machine for granulating or disintegrating sugary, saline, or other compounds or mixtures to a product of fairly even, fine granulation with a minimum of dust.

A second object of the invention consists in the provision of a plurality of roughened surfaces such as screens, providing between them a substantially vertical passage through which the sugar or other mixture may pass, one or both of the surfaces moving to create a rubbing action upon the material to break up lumps and to reduce the material to the chosen sizes which may be regulated by the distance apart of the surfaces or the mesh size of the screens, or both.

A further important object of the invention is to provide a granulator of large capacity in which the combined rubbing and vibrating action of the device not only secures a uniformity of particle size but it has good self-cleaning qualities.

A still further object of the invention lies in the provision of a method of sifting wet friable materials, which ordinarily could be satisfactorily granulated only by hand, by passing them through a series of granulators as here described, first through a large-sized mesh screen and then after a drying period, timed in accordance with the material being sifted, running them through the next size smaller screen, etc. giving a resulting product of uniform size which to all practical purposes is free from dust.

A still further object of the invention lies in the provision of a method to break up and sift dry, friable materials, which heretofore had to be ground or otherwise broken up before sifting, the present process resulting in a finished product with no tailings left behind and with a minimum amount of dust. Many materials which cannot be sifted on other types of sifters because of clogging can be sifted successfully on the present apparatus.

In the drawings:

Figure 1 is a vertical section thru a pair of screens embodying my invention.

Figure 2 is a side elevation.

Figure 3 is a top plan view.

Figures 4 and 5 show modified forms.

In its preferred form the granulator consists of two frames each carrying a steel screen. The right-hand screen is shown stationary and the left-hand frame has a simple reciprocating up and down movement, which in many instances seems equally as efficient as the alternately opposite movements of the granulator of Figure 4 or the circular movement of the two frames of the granulator shown in Figure 5.

The supporting structure in the preferred form is composed of two arches, 10 and 11, each of angle iron and joined at the bottom by similar rolled steel sections 12 as by welding. To the arch 10 is secured the frame 15 as by spacing brace members 16 which need not be adjustable but are welded to the frame 15 and bolted to the channel iron of the arch 10 as at 17. Across the inner face of the frame 15 is secured a steel screen 20, stretched tightly in place and held by the flat steel clamping bars 21 with their screws 22. At suitable distances apart I secure to the frame 15 parallel steel bars 23 to support the screen 20 and to hold it in one plane, whether it be of wire textile fabric or a foraminous sheet.

To the other arch 11 I secure bearing blocks 26 which may be held in adjustable position by suitable means, for example, the bolts 27. Similar blocks 28 are adjustably carried by a bracket 29 secured to the angle iron of arch 11. In these bearing blocks 26 and 28 are slidably mounted a pair of parallel shafts 30 to which are rigidly secured as by the bracket 32 a second frame 33, this frame being considerably larger than the frame 20 and being parallel to it only for a portion of its extent. Like the simpler frame 20 it is composed of channel iron and has similar clamps 34 held by screws 35 for securing its rough surface or screen 36 in place. I prefer that the two frames shall extend parallel to one another for nearly one half of the height of the frame 20 and that the frame 33 shall then form an angle with the frame 20, either abruptly as shown or through a smooth curve as in the granulator of Fig. 4 and that the angle again be widened beginning at a point 38 below the top of the frame 20.

The two shafts 30 are secured together by a bar 40 to which at its central point is pivoted as at 41 a connecting rod 42 receiving motion from eccentric 43 on main shaft 44 mounted in pedestals 46 and receiving power in any way as from pulley 45. A hopper 48 feeds the material to be granulated or broken down between the two screens 20 and 36 and a pan 49 collects and discharges the sieved material to the next conveyor, which usually will further dry the granulated material before delivering it to the next smaller mesh granulator. Altho machines are preferably constructed so that the screen can easily be removed and replaced with screens of a different mesh, this is not essential and the screen may be permanently secured to the frame.

In the modified form illustrated in Figure 4 the frames 55 and 56 are caused to reciprocate alternately in opposite directions as indicated by the arrows 57 by mechanism of any well known type. The frame 56 is quite similar to frame 15 and its rough surface should be a screen as at 58. The frame 55 differs from frame 33 largely in being curved as at 59 to a point near its bottom whereas in the preferred form the two rough surfaces are substantially parallel at or near the bottom for a distance at least equal to the amount of reciprocating movement. Its rough surface, like that of the frame 33 may be an imperforate sheet of metal but preferably is a wire screen 60 with a mesh having openings equal to the distance apart of the screens where they are parallel.

Figure 5 shows a further modification, the screen 62 in the general direction of travel of the material to be sifted being slightly inclined to vertical. The second screen 63 of this pair is mounted on a frame 64, much like frame 33 but having two plane surfaces at an obtuse angle and joined by a smooth curve as at 65. In this modification the two frames are each given a rotary granulating motion as indicated by the arrows 66, as by the use of the two driving mechanisms, reciprocating the frame at the same or different rates, one horizontally and the other vertically. These movements are well known and therefore neither claimed nor specifically illustrated.

The operation will now be described. The material is fed to the hopper 48 usually, tho not necessarily, before it is dry. The frame 15 with its screen 30 is stationary but the frame 33 with its screen 36 or other rough surface is constantly vibrating, preferably up and down, at a speed depending entirely upon the material being treated. For sugar, for example, the speed might readily be 400 revolutions per minute. The upper portion 49 of the larger screen 36 will pass the fines directly but the larger particles will pass by gravity into the smaller portion 50 of the trough between the two screens aided by the action of the vibrating sieve. The middle portion of the trough will then cut the larger lumps into smaller lumps and the lower portions of the screens will cut the material to the fineness of mesh of the screen or as determined by the setting of the machine. Not only are tailings eliminated to a very large degree, but the length of life of the screens is much increased, even where the material is granulated when it is fairly well along in the drying process. Most frequently there will be a plurality of these granulators in series with a drying conveyor for transferring the material from each size screen to the next smaller mesh granulator.

What I claim is:

1. In a device granulating sugary masses, a rigid frame including a bottom member, a pair of side members rising vertically therefrom and then sloping away from a vertical plane, a top member joining the free ends of the side members, a plurality of stiffening members connecting the top and bottom members, alined with the side members and parallel thereto, a wire screen detachably secured to the frame and engaging the stiffening members to present a rough granulating surface all intersections of which with horizontal planes are straight lines, a rough, substantially vertical surface forming with the screen a trough, and means for imparting to the frame a rapid cutting movement while holding the lower portion of the screen close to the rough surface so that the granulated material will pass through the screen and the frame.

2. The method of disintegrating a sugary mixture to a fine granulation with a minimum of dust which consists in passing the wet mass thru a large mesh screen, drying it partially, running it thru a medium mesh screen, drying, and then sifting the material between two fine, relatively movable screens spaced apart a distance equal approximately to the size of the mesh opening.

ERNST REINECKE.